Nov. 16, 1943.  J. J. SERRELL  2,334,446
POLARIZING GOGGLES
Filed Dec. 26, 1941

Patented Nov. 16, 1943

2,334,446

UNITED STATES PATENT OFFICE 2,334,446

POLARIZING GOGGLES

John J. Serrell, deceased, late of Elizabeth, N. J., by Florence A. Serrell, executrix, Holmdel, N. J., assignor to Polaroid Corporation, Dover, Del., a corporation of Delaware Application December 26, 1941, Serial No. 424,480

6 Claims. (Cl. 88—54)

This invention relates to eyeglasses and more specifically to light-polarizing lenses held by spectacles and other like frames.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide an eyeglass which, without adjustment except for a slight tilting of the head, may be used to shield the eye of the wearer from light polarized in a plurality of directions; to provide such an eyeglass which will, as desired, allow all light to reach the eye of the wearer.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

Figure 1:
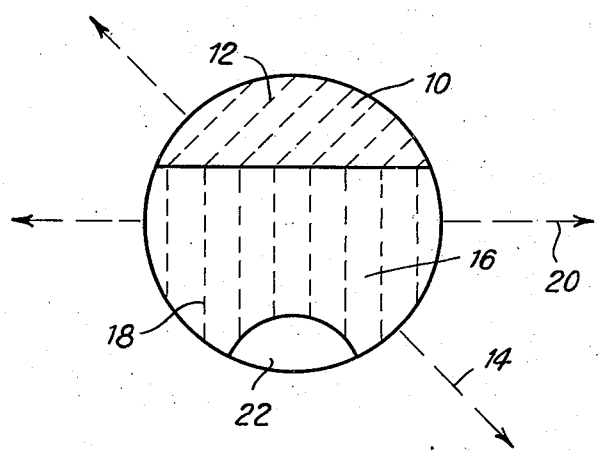
Figure 2:
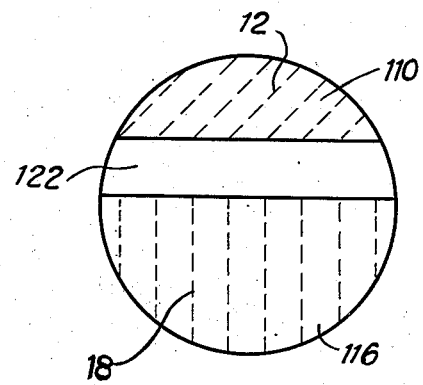

For a fuller understanding of the nature and objects of the invention, reference should be had to the following detailed description, taken in connection with the accompanying drawing, in which:

Figure 1 is a diagrammatic view of a device embodying one form of the invention; and Fig. 2 is a similar view of a modification of the device shown in Fig. 1.

In vehicle lighting systems employing polarized light, the preferred direction of vibration of the projected light is at an angle of 45 degrees to the vertical while the direction of vibration of specularly reflected, glaring sunlight from road surfaces, water and the like is largely horizontal. Hence, glasses which are designed to block headlight glare do not block daytime road glare satisfactorily. The lenses described below and made in accordance with the present invention have a portion which blocks one type of polarized light and another portion which blocks the other type of polarized light. They also may have a completely transparent portion. A tilt of the head of the wearer permits the light rays to pass through one or another of the portions of the eyeglass in accordance with the light which the wearer desires to have enter his eye.

Fig. 1 represents an eyeglass or lens such, for example, as one of two used as a pair in spectacles, goggles and the like. Segment 10 of said lens is adapted to polarize light so that the vibrations, indicated by broken lines 12, of the transmitted rays are at an angle of 45° with the vertical. It has been suggested that in vehicle lighting systems using polarized light, the preferred orientation of the polarizing devices in the headlights be such as to cause the projected polarized light to vibrate at 45° with the horizontal. It is accordingly intended that the polarizing axis of segment 10 be so positioned as to block such light, indicated by arrow 14, in order to permit a user looking through that segment to look toward the lights of an approaching car without being blinded thereby.

Another segment 16 is adapted to polarize light so that the vibrations, indicated by broken lines 18, of the transmitted rays are vertical, thus blocking, to a large extent at least, the specularly reflected daytime road glare which vibrates in a horizontal direction, as indicated by arrow 20. Segment 16 may be larger than segment 10 and may be used in daytime driving to cut off glare from the road surfaces.

A still further portion 22 of the eyeglass which may, as shown, be at the bottom of the eyeglass and be bounded by the arcs of two circles, may be transparent and non-polarizing and so transmits light vibrating in any direction. If there is no such portion 22, segment 16 may extend to the bottom of the eyeglass.

An eyeglass lens having the above properties and characteristics may be made in a number of ways. It may be made particularly conveniently in laminated form, comprising an inner layer of light-polarizing material bonded between two outer layers of glass by any suitable transparent cement. A suitable polarizing material for this purpose is a set suspension of oriented dichroic particles in a transparent plastic such as cellulose acetate, such, for example, as that available in thin sheets under the trade name "Polaroid." Such sheets can easily be cut to the desired shape, such as those illustrated for areas 10 and 16, properly positioned with respect to their polarizing axes, and then cemented between glass disks to form the finished lens.

In daytime driving, the wearer of eyeglasses having lenses such as that shown in Fig. 1 receives light through segment 16, his head being held upright. Road glare is avoided thereby. When a car approaches at night, he tilts his head forward and receives light through segment 10 whereby he is shielded from the light from the approaching car. Should he care to observe objects immediately ahead and below the level of his eyes, for example, in walking, he looks through segment 22 and receives all of the light which is available from that direction.

The form of eyeglass lens shown in Fig. 2 has a non-polarizing portion 122 between the upper portion 110 and lower portion 116. The two latter portions are similar in polarizing effect to the portions in Fig. 1 numbered 10 and 16. The boundaries between the portions may be horizontal lines as shown, or curved, if desired. This form may be used when there is normally no glare from approaching cars or from the road surface. The wearer, by tilting his head, can avoid those glares.

Other portions with various polarizations or lack of polarization may be positioned as desired within the periphery of the eyeglass. There may be but two segments, one polarizing and one non-polarizing, and such a lens may be exceedingly useful in night driving, particularly if the polarizing area thereof be so oriented with respect to its polarizing axis that it will block polarized light projected by headlights to vibrate in a preferred direction. It will be obvious, moreover, that the different areas or portions of the lens may have various configurations and relative sizes.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

It is claimed:

1. An eyeglass lens having a plurality of areas adapted to polarize transmitted light, the polarizing axis of one of said areas being at an angle of approximately 45° to the polarizing axis of the other said area.

2. An eyeglass lens having a plurality of areas adapted to polarize transmitted light, one of said areas being so positioned with respect to its polarizing axis as to transmit light vibrating perpendicularly to the horizontal, the polarizing axis of the other said area being at an angle of approximately 45° to the polarizing axis of the first said area.

3. An eyeglass lens having a plurality of areas adapted to polarize transmitted light and another, transparent, non-polarizing area, the polarizing axis of one of said polarizing areas being at an angle of approximately 45° to the polarizing axis of the other said area.

4. An eyeglass lens having a plurality of areas adapted to polarize transmitted light and another, transparent, non-polarizing area, one of said polarizing areas having its polarizing axis so positioned as to transmit light vibrating perpendicularly to the horizontal, the polarizing axis of the other said polarizing area being at an angle of approximately 45° to the polarizing axis of the said first named polarizing area.

5. An eyeglass lens comprising an upper portion adapted to polarize transmitted light to vibrate at an angle of approximately 45° to the horizontal, a middle portion adapted to polarize transmitted light to vibrate perpendicularly to the horizontal, and a lower, non-polarizing area adapted to transmit light irrespective of the polarization characteristics thereof.

6. An eyeglass lens comprising an upper portion adapted to polarize transmitted light to vibrate at an angle of approximately 45° to the horizontal, a lower portion adapted to polarize transmitted light to vibrate approximately perpendicularly to the horizontal, and a middle, non-polarizing area adapted to transmit light irrespective of the polarization characteristics thereof.

FLORENCE A. SERRELL.
*Executrix of the Estate of John J. Serrell, Deceased.*